(12) United States Patent
Abusleme et al.

(10) Patent No.: US 7,439,297 B2
(45) Date of Patent: Oct. 21, 2008

(54) FOAMABLE FLUOROPOLYMERS COMPOSITIONS WITHOUT USING FOAMING AGENTS

(75) Inventors: Julio A. Abusleme, Varese (IT); Claudia Manzoni, Bologna (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 10/948,790

(22) Filed: Sep. 24, 2004

(65) Prior Publication Data

US 2005/0107517 A1    May 19, 2005

(30) Foreign Application Priority Data

Sep. 26, 2003  (IT) .......................... MI2003A1847

(51) Int. Cl.
C08J 3/20 (2006.01)
C08J 9/06 (2006.01)
C08K 5/04 (2006.01)
C08K 5/09 (2006.01)
C08L 27/18 (2006.01)
C08L 27/04 (2006.01)
C08L 27/12 (2006.01)
B05D 1/08 (2006.01)

(52) U.S. Cl. ........................ 524/544; 524/425; 524/445; 524/447; 524/451; 524/394; 524/395; 524/396; 524/398; 524/399; 521/138; 521/139; 521/134; 521/145; 521/92; 525/455; 525/539; 428/423.1; 428/424.2

(58) Field of Classification Search ................ 524/545, 524/519, 544, 394–399, 425, 445, 447, 451; 521/92, 138, 134, 145, 199, 200; 428/423.1, 428/424.2; 525/455, 539

See application file for complete search history.

(56) References Cited

U.S. PATENT DOCUMENTS

| 4,624,990 A | * | 11/1986 | Lunk et al. ................... 525/199 |
| 4,764,538 A | * | 8/1988 | Buckmaster et al. .......... 521/85 |
| 5,294,248 A | * | 3/1994 | Chittofrati et al. ............. 106/10 |
| 5,310,775 A | * | 5/1994 | Sibilia et al. ................. 524/398 |
| 5,314,925 A | * | 5/1994 | Burnell et al. ................. 521/92 |
| 5,468,782 A | * | 11/1995 | Mehan ....................... 521/134 |
| 5,597,880 A | | 1/1997 | Abusleme et al. |
| 5,716,665 A | * | 2/1998 | Vita et al. .................... 427/119 |
| 5,837,173 A | | 11/1998 | Vita et al. |
| 6,107,393 A | * | 8/2000 | Abusleme et al. ........... 524/545 |

FOREIGN PATENT DOCUMENTS

EP      0 710 697 A1   11/1994

OTHER PUBLICATIONS

Hawley's Condensed Chemical Dictionary, 11$^{th}$ Ed., p. 164, 1987.*
Product Data Sheet for Algoflon L 203.*
"Polymer Science Dictionary", Ed. by Mark Alger, p. 112.*
C. Garbuglio, et al. "Copolymerization of ethylene and Chlorotrifluoroethylene by Trialkylboron Catalysts-II.", European Polymer Journal Ltd., 1967, vol. 3, pp. 137-144.

* cited by examiner

*Primary Examiner*—Duane Smith
*Assistant Examiner*—Ives Wu
(74) *Attorney, Agent, or Firm*—Arent Fox LLP.

(57) ABSTRACT

A composition comprising:
A) 50-99.9% by weight of at least a copolymer (1) of ethylene (E) with chlorotrifluoroethylene (CTFE) wherein CTFE is comprised between 53 and 70% by moles, having a crystallinity in the range 5-45%;
B) 0.1-50% by weight of a fine powder of a nucleating agent, having an average particle size lower than 50 micron and a melting temperature higher than 300° C.

17 Claims, No Drawings

FOAMABLE FLUOROPOLYMERS COMPOSITIONS WITHOUT USING FOAMING AGENTS

The present invention relates to foamable fluoropolymer compositions without using foaming agents capable to give foamed coatings with good electric insulation properties.

More specifically the present invention relates to foamable compositions of an ethylene (E) copolymer with chlorotrifluoroethylene (CTFE).

It is known that fluoropolymers, for their excellent properties of chemical resistance, flame resistance and their good electric insulation properties, can be used in a wide range of applications, in particular in the electric cable coating for their low dielectric constant and the low tanδ at high frequencies. In particular in the electric cable coating, fluoropolymers are used as foams with a void degree of at least 10%, with the advantage of a further decrease of the dielectric constant and of the tanδ and to use a lower amount of fluoropolymer.

The prior art relating to the coating of electric cables with foamed fluoropolymers comprises the use of mixtures of a fluoropolymer and a nucleating agent as, for example, boron nitride or polytetrafluoroethylene (PTFE) particles, foamed during extrusion. The foaming can be obtained by using an inert gas as, for example, $N_2$ or $CO_2$, directly fed into the extruder. See for example U.S. Pat. No. 5,837,173.

The use of an inert gas shows the drawback that it is not easy to calibrate the gas inlet during the extrusion at a flowrate suitable to obtain the desired foaming. Anyway it is necessary to use an expensive and complex equipment, working at a high pressure, to reach a coating uniformity of the foamed cable.

The foaming can also be obtained by adding to the mixture foaming agents, that decompose producing volatile products.

The use of said foaming agents shows the drawback that they leave residues in the foamed fluoropolymer which can modify its electric insulation properties.

As fluoropolymers, the copolymer E/CTFE is conventionally used for the electric cable coating. The commercial polymer ECTFE is known as Halar® and is formed by 50% by moles of E and by 50% by moles of CTFE.

Tests carried out by the Applicant have shown that by extruding a mixture of a commercial ECTFE copolymer (Halar®) mixed with irradiated PTFE, without the use of foaming agents, an electric cable coating has been obtained having a negligible void degree and therefore giving a poor electric insulation degree.

The need was therefore felt to have available foamable compositions based on E/CTFE and on PTFE without the use of foaming agents and capable to give homogeneous electric coatings having a void degree of at least 10% and therefore endowed with a high electric insulation degree and with a good uniformity of the foamed coating.

It has been surprisingly and unexpectedly found a composition based on an ethylene (E) copolymer with chlorotrifluoroethylene (CTFE) capable to meet the above requirements.

An object of the present invention is compositions consisting essentially of:

A) 50-99.9% by weight of at least a copolymer (1) of ethylene (E) with chlorotrifluoroethylene (CTFE) wherein the CTFE is between 53 and 70% by moles, optionally containing from 0.1 to 10% by moles of a third monomer, said polymer having a crystallinity in the range 5-45%;

B) 0.1-50% by weight of a fine powder of a nucleating agent, having an average particle size lower than 50 micron, preferably lower than 20 micron, and a melting temperature higher than 300° C.

Component B) is selected, for example, among the TFE homopolymer, TFE copolymers containing at most 0.5% by moles of one or more perfluorinated comonomers, boron nitride, silicon nitride, silica, alumina, talc, zinc sulphide or their mixtures.

When the nucleating agent B) is an inorganic compound, it is used in amounts between 0.1% and 5% by weight; when the nucleating agent B) is a polymeric compound, it is preferably used in an amount from 2 to 40% by weight, more preferably from 5 to 20%.

The preferred component B) is the TFE homopolymer or its copolymers containing at most 0.5% by moles of a (per)fluorinated comonomer, for example (per)fluoroalkylvinylethers wherein the alkyl is a $C_1$-$C_3$, hexafluoropropene or (per)fluorodioxoles of formula

(I)

wherein Z is selected from —F, —H, —Cl; Y is equal to $OR_f$ wherein $R_f$ is a perfluoroalkyl having from 1 to 5 carbon atoms, or Y=Z; preferably Y is equal to $OR_f$; $X_1$ and $X_2$, equal to or different from each other, are —F or —$CF_3$; preferably fluorodioxoles of formula (I) wherein Y is equal to —$R_f$, —$OR_f$ wherein $R_f$ is —$CF_3$ and $X_1$, $X_2$ and Z are —F.

More preferably, as component B), the tetrafluoroethylene homopolymer (PTFE) having a number average molecular weight lower than 1,000,000, preferably lower than 500,000, is used. Said PTFE is preferably obtained by irradiating with gamma rays or electron beam PTFE powders prepared by dispersion or suspension polymerization processes and then by milling said irradiated powders.

PTFE latexes having particle sizes of about 0.1-0.3 micron are obtained with dispersion polymerization processes. After coagulation the powder particle sizes increase to about 100-500 micron. Said powders are irradiated with gamma rays and then milled to obtain powders having final particle sizes lower than 15 micron (commercial product PTFE Algoflon® L 206 and Algoflon® L 203).

PTFE powders having particle sizes of 2-5 mm are obtained with suspension polymerization processes. Said powders are irradiated with electron beam and then milled to obtain powders having a final particle size lower than 15 micron.

The number average molecular weight of the irradiated PTFE has values lower than 1,000,000, generally lower than 500,000 and is determined from the total amount $N_g$ (in moles/kg) of the PTFE end groups —$CF_2COOH$ and —$CF_2COF$, determined by FT-IR spectroscopy. The number average molecular weight ($M_n$) is calculated by the following formula $M_n=2000/N_g$.

The copolymer (1) is preferably formed by 54-60% by moles of CTFE.

As third monomer of the copolymer (1) one can mention:
perfluoroalkylvinylethers, wherein the alkyl is a $C_1$-$C_3$;
(per) fluoro dioxoles having formula (I) as above defined.
For the preparation of these copolymers the teaching of U.S. Pat. No. 5,597,880 can be followed;
acrylic monomers having general formula:

(II)

wherein $R_1$ is H or a $C_1$-$C_{20}$ alkyl radical, optionally containing heteroatoms of Cl, O, N and/or one or more functional groups selected from —OH, —COOH, epoxide, ester and ether. Preferably $R_1$ is an alkyl radical from 1 to 10 carbon atoms containing one or more functional hydroxide groups. For example ethylacrylate, n-butylacrylate, acrylic acid, hydroxyethylacrylate, hydroxypropylacrylate, (hydroxy)-ethylhexylacrylate, etc, can be mentioned. Also one or more of said acrylic monomers can be used.

For the preparation of these copolymers one can follow the teaching of U.S. Pat. No. 6,107,393. The above patents are herein incorporated by reference.

Among the acrylic monomers of formula (II) the preferred is n-butylacrylate (n-BuA).

Copolymer (1) is known and is preparable for example according to U.S. Pat. Nos. 5,597,880 and 6,107,393.

Component A) can be a mixture of the copolymer (1) with a semicrystalline fluoropolymer (2) wherein the ratio by weight between (1): (2) is in the range 1:20-20:1, said fluoropolymer (2) being selected from:

TFE semicrystalline thermoplastic copolymers with amounts between 1% and 15% by moles of fluorinated monomers, as, for example, perfluoroalkylvinylethers (PAVE), perfluorodioxoles, fluorosulphonyl(per)fluoroalkyl vinylether, hexafluoropropene (HFP);

semicrystalline thermoplastic copolymers of ethylene (E) with TFE, optionally containing one or more fluorinated monomers as, for example, PAVE, perfluorodioxoles, or acrylic monomers described in U.S. Pat. No. 6,107,393;

semicrystalline thermoplastic copolymers of ethylene (E) with CTFE having a CTFE content between 40 and 52% by moles, optionally containing one or more fluorinated monomers as, for example, PAVE, perfluorodioxoles, or acrylic monomers described in U.S. Pat. No. 6,107,393;

polyvinylidene fluoride (PVDF) or semicrystalline thermoplastic copolymers of vinylidene fluoride (VDF) containing between 0.1% and 10% of one or more fluorinated monomers, as, for example, HFP, TFE, CTFE, trifluoroethylene, PAVE and perfluorodioxoles.

The preferred semicrystalline fluoropolymer (2) of component A) is a copolymer E/CTFE having a CTFE content between 48% and 52% by moles, preferably 50% by moles of CTFE typical of the commercial product Halar®.

The invention compositions can also contain known additives of the prior art as, for example, thermal stabilizers, UV stabilizers, pigments, flame-retardants, reinforcing agents.

Another object of the present invention are foamed molded articles and foamed coatings of electric cables having a void degree higher than 10% by volume obtained by thermoforming or extrusion of the invention composition without using foaming or blowing agents known in the prior art as, for example, nitrogen, $CO_2$, or light fractions of perfluoropolyethers as described in U.S. Pat. No. 5,716,665.

The thermoforming or extrusion process of the invention composition is carried out at temperatures in the range 200°-400° C.

In particular the foamed coatings of electric cables have a void degree higher than 10% by volume, preferably higher than 20% by volume, wherein the average cell sizes are lower than 100 micron, preferably lower than 60 micron. The obtained electric cables have an uniform foamed coating, a low tanδ and therefore a low attenuation.

The tanδ is defined as the ratio between the real part and the imaginary part of the dielectric constant at a defined frequency.

The invention compositions can also be used to prepare foamed articles as, for example, thermal and sound insulating panels for the commercial and residential building industry, shock-resistant coatings, and for the thermal insulation for example of electrical appliances or in the automotive industry, or for the tank insulation.

Preferably the compositions A)+B) of the invention are used to coat metal conductors by extrusion.

Some Examples follow for illustrative and not limitative purposes of the scope of the invention.

EXAMPLES

The following characterizations are carried out on the materials of the Examples:

Crystallinity The crystallinity (%) is calculated by the value of the second melting enthalpy (or crystallization entalpy) $\Delta H_{2f}$ measured by differential scanning calorimetry (DSC) at 10° C./min, using the following formula:

$$\text{Crystallinity (\%)} = [\Delta H_{2f}(\text{cal/g})/22.0] \times 100$$

wherein the value of 22.0 cal/g refers to the perfectly alternated E/CTFE polymer having a 100% crystallinity, according to what described in "European Polymer Journal", 1967, vol. 3, pages 137-144.

Cell Sizes The cell sizes have been determined by an electron scanning microscope (SEM) Stereoscan 200 model by Cambridge Instruments.

Void Degree (%) It has been calculated by the following equation:

$$\text{Void \%} = 100 \ast (\varrho_c - \varrho_m)/\varrho_c \text{ wherein:}$$

$\varrho_c$=calculated density of the composition A)+B) obtained by the weight average of the measured densities of A) and B);

$\varrho_m$=measured density of the foamed composition according to the ASTM D 792 standard.

Example 1

Component A)

Component A) is a powder of a copolymer (1) ECTFE with composition E/CTFE equal to 43/57% by moles and crystallinity =27%.

Component B)

Component B) is a TFE homopolymer obtained by suspension polymerization and subjected to irradiation with electron beam and subsequent milling, having a number average molecular weight of 100,000 and an average particle size equal to 10 micron, commercially available as POLYMIST F5A by Solvay Solexis of the Solvay Group.

Preparation of A)+B)

A powder blend was prepared formed of:
78% by weight of A);
22% by weight of B).

The dry blend was granulated in a single screw extruder Brabender having a diameter of 18 mm. The extruder worked at 45 rpm setting the three heating zones starting from the hopper at 195° C., 215° C., 215° C. The head temperature was set at 220° C.

Cable Extrusion

The pellets were used to coat by extrusion a copper cable of monowire AWG 24 type with a diameter of 0.51 mm.

For covering the cable, a Davis line was used with Sterling single screw extruder having a diameter of 38 mm with a ratio length/diameter of 30 and made of steels resistant to the corrosion suitable for the processing of fluorinated polymers, such as Hastelloy C276.

Furthermore a tube die having a draw down ratio (DDR) of about 100 was used to cover the conductor with a thickness of 0.15 mm of the foamed blend A)+B).

The working conditions of the test are hereinafter summarized. The temperature profile increases from the hopper to the head of the extruder from 220° C. to 300° C., leading to a temperature of the melt of 275° C. The material was extruded at 8 rpm with a line speed of about 40 m/min. The head extruder pressure is under these conditions about 83 bar. Under said conditions, it is noticed foaming of the polymer coming out from the head wherein it is cooled by passing it in a water bath at room temperature.

The void degree of the cable coating is 21%.

The size of the obtained cells ranges from 5 to 50 micron.

Example 2

Component A)
A powder blend was prepared formed of:
87.5% by weight of a copolymer (1) E/CTFE with a composition equal to 43/57% by moles and crystallinity=27% (component A) of Example 1);
12.5% by weight of a copolymer (1) formed • of E/CTFE/BuA (n-butylacrylate) having a composition 40/55/5% by moles and crystallinity=15%.

Component B)
Component B) is the same PTFE of the Example 1.

Preparation of A)+B)
A powder blend was prepared formed of:
80% by weight of A);
20% by weight of B).
The dry blend was granulated as in the Example 1.

Cable Extrusion
The pellets were used to coat by extrusion a copper cable as in the Example 1. The material was extruded at 9 rpm with a line speed of about 31 m/min. The head extruder pressure is under these conditions about 76 bar. Under said conditions, it is noticed foaming of the polymer coming out from the head wherein it is cooled by passing it in a water bath at room temperature.

The void degree of the cable coating is 32%.

The size of the obtained cells ranges from 5 to 50 micron.

Example 3

Comparative

Preparation of A)+B)
A powder blend was prepared formed of:
90% by weight of a copolymer E/CTFE/Bua having a composition 49.6/50/0.4% by moles and crystallinity=39%;
10% by weight of PTFE commercially available as POLYMIST F5A (component B) of the Example 1).

The dry blend was granulated in the same single screw extruder of the Example 1. The extruder worked at 35 rpm by setting the three heating zones, starting from the hopper, at 230° C., 240° C., 250° C. The head temperature was set at 260° C.

Cable Extrusion
The pellets were used to coat by extrusion a copper cable as in the Example 1. The temperature profile increases from the hopper to the head of the extruder from 240° C. to 290° C., leading to a temperature of the melt of 311° C. The material was extruded at 10 rpm with a line speed of about 34 m/min. The head extruder pressure is under these conditions about 59 bar.

The void degree of the cable coating is 3%.

Example 4

Comparative

Preparation of A)+B)
A powder blend was prepared formed of:
90% by weight of a copolymer E/CTFE having a composition equal to 50/50% by moles and crystallinity=49%;
10% by weight of PTFE commercially available as POLYMIST F5A (component B) of the Example 1).

The dry blend was granulated as in the Example 3.

Cable Extrusion
The pellets were used to coat by extrusion a copper cable as in the Example 1.

The temperature profile increases from the hopper to the head of the extruder from 240° C. to 310° C., leading to a temperature of the melt of 316° C. The material was extruded at 7 rpm with a line speed of about 63 m/min. The head extruder pressure is under these conditions about 20 bar.

No foaming of the polymer coming out from the extruder head is noticed.

Example 5

Component A)
A powder blend was prepared formed of:
10% by weight of a copolymer (1) formed of E/CTFE/n-Bua having a composition by moles 40/55/5 and a crystallinity=15%;
90% by weight of a fluoropolymer (2) formed of a copolymer E/CTFE having a composition equal to 50/50% by moles and crystallinity=49% (copolymer of the Example 4).

Component B)
Component B) is the same PTFE of the Example 1.

Preparation of A)+B)
A powder blend was prepared formed of:
90% by weight of component A);
10% by weight of component B).
The dry blend was granulated as in the Example 3.

The pellets were again fed in the same single screw extruder working at 40 rpm and setting the three heating zones, starting from the hopper, at 220° C., 240° C. and 260° C. and the head temperature at 280° C., obtaining an extrudate.

The void degree of the extrudate is 28%.

The invention claimed is:
1. A composition consisting essentially of:
A) 50-99.9% by weight of at least a copolymer (1) of ethylene (E) with chlorotrifluoroethylene (CTFE) wherein CTFE is between 53 and 70% by moles, optionally containing from 0.1 to 10% by moles of a third monomer, said polymer having a crystallinity in the range 5-45%;

B) 0.1-50% by weight of a fine powder of a nucleating agent, having an average particle size lower than 50 micron, and a melting temperature higher than 300° C., selected from TFE homopolymers or TFE copolymers containing at most 0.5% by moles of one or more perfluorinated comonomers, wherein said composition when submitted to thermoforming or extrusion at temperatures in the range 200°-400° C. gives foamed molded articles and foamed coatings having a void degree higher than 10% by volume.

2. Composition according to claim 1, wherein when the nucleating agent B) is used in an amount from 2 to 40% by weight.

3. Composition according to claim 1, wherein component B) is the TFE homopolymer or its copolymers containing at most 0.5% by moles of a (per)fluorinated comonomer selected from (per)fluoroalkylvinylethers wherein the alkyl is a $C_1$-$C_3$, hexafluoropropene or (per)fluorodioxoles of formula

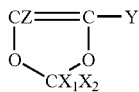 (I)

wherein Z is selected from —F, —H, —Cl; Y is equal to $OR_f$ wherein $R_f$ is a perfluoroalkyl having from 1 to 5 carbon atoms, or Y=Z; $X_1$ and $X_2$, equal to or different from each other, are —F or —$CF_3$.

4. Composition according to claim 1, wherein component B) is the tetrafluoroethylene homopolymer (PTFE) having a number average molecular weight lower than 1,000,000.

5. Composition according to claim 4, wherein the PTFE is obtained by irradiating with gamma rays or electron beam PTFE powders prepared by dispersion or suspension polymerization processes and then by milling said irradiated powders.

6. Composition according to claim 1, wherein the copolymer (1) is formed of 54-60% by moles of CTFE.

7. Composition according to claim 1, wherein the third monomer of the copolymer (1) is selected from:
perfluoroalkylvinylethers wherein the alkyl is a $C_1$-$C_3$;
(per)fluoro dioxoles having formula (I) as above defined;
acrylic monomers having general formula:

$$CH_2=CH-CO-O-R_1 \quad (II)$$

wherein $R_1$ is H or a $C_1$-$C_{20}$ alkyl radical, optionally containing heteroatoms of Cl, O, N and/or one of more functional groups selected from —OH, —COOH, epoxide, ester and ether.

8. Composition according to claim 7, wherein the acrylic monomer is selected from ethylacrylate, n-butylacrylate, acrylic acid, hyroxyethylacrylate, hydroxypropylacrylate, (hydroxyl)-ethylhexylacrylate.

9. Composition according to claim 8, wherein the third monomer is n-butylacrylate (n-Bua).

10. Composition according to claim 1, wherein component A) is a mixture of the copolymer (1) with a semicrystalline fluoropolymer (2) wherein the ratio by weight between (1):(2) is in the range 1:20-20:1, said fluoropolymer (2) is selected from:
TFE semicrystalline thermoplastic copolymers with amounts between 1% and 15% by moles of fluorinated monomers
semicrystalline thermoplastic copolymers of ethylene (E) with TEE, optionally containing one or more fluorinated monomers;
semicrystalline thermoplastic copolymers of ethylene (E) with CTFE having a CTFE content between 40 and 52% by moles, optionally containing one or more fluorinated monomers;
polyvinylidene fluoiide (PVDF) or semicrystalline thermoplastic copolymers of vinylidene fluoride (VDF) containing between 0.1% and 10% of one or more fluorinated monomers.

11. Composition according to claim 10, wherein the semicrystalline fluoropolymer (2) is a copolymer E/CTFE having a CTFE content between 48% and 52% by moles.

12. A method of coating electric conductors comprising applying the compositions according to claim 1 to electric conductors.

13. Foamed articles and foamed coatings of electric cables having a void degree of at least 10% by volume obtained by thermoforming or extrusion at 200° C.-400° C. of the compositions of claim 1.

14. Electric cables according to claim 13, wherein the foamed coating has a void degree higher than 20% by volume, wherein the average cell sizes are lower than 100 micron.

15. Composition according to claim 3, wherein Y =$OR_f$.

16. Composition according to claim 3, wherein alkyl is fluorodioxoles of formula (I) wherein Y is equal to —$R_f$, —$OR_f$, wherein $R_f$ is —$CF_3$ and $X_1$, $X_2$ and Z are —F.

17. Composition according to claim 10, wherein:
the TEE semicrystalline thermoplastic copolymers are perfluoroalkylvirtylethers (PAVE), perfluorodioxoles, fluorosulphonyl(per)fluoroalkyl vinylether, or hexafluoropropene (HFP);
the semicrystalline thermoplastic copolymers of ethylene (E) with TFE are PAVE and perfluorodioxoles, or acrylic monomers;
the semicrystalline thermoplastic copolymers of ethylene (E) with CTFE are PAVE and perfluorodioxoles, or acrylic monomers;
the polyvinylidene fluoride (PVDF) or semicrystalline thermoplastic copolymers of vinylidene fluoride (VDF) are HEP, TEE, CTFE, trifluoroethylene, PAVE and perfluorodioxoles.

* * * * *